(12) United States Patent
Johnson et al.

(10) Patent No.: US 11,599,322 B1
(45) Date of Patent: Mar. 7, 2023

(54) SYSTEMS WITH OVERLAPPED DISPLAYS

(71) Applicant: Apple Inc., Cupertino, CA (US)

(72) Inventors: Paul V. Johnson, San Francisco, CA (US); Aaron Wang, San Jose, CA (US); Dinesh C. Mathew, San Francisco, CA (US); Jiaying Wu, San Jose, CA (US); Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 17/006,677

(22) Filed: Aug. 28, 2020

Related U.S. Application Data

(60) Provisional application No. 62/906,654, filed on Sep. 26, 2019.

(51) Int. Cl.
| | |
|---|---|
| G06F 3/14 | (2006.01) |
| G06F 3/04883 | (2022.01) |
| G06F 3/0486 | (2013.01) |
| G06F 3/01 | (2006.01) |
| G06F 3/041 | (2006.01) |
| G06F 3/0346 | (2013.01) |
| G06F 3/16 | (2006.01) |
| G06V 20/10 | (2022.01) |

(52) U.S. Cl.
CPC ............ *G06F 3/1423* (2013.01); *G06F 3/016* (2013.01); *G06F 3/0346* (2013.01); *G06F 3/041* (2013.01); *G06F 3/0486* (2013.01); *G06F 3/04883* (2013.01); *G06F 3/16* (2013.01); *G06V 20/10* (2022.01)

(58) Field of Classification Search
None
See application file for complete search history.

(56) References Cited

U.S. PATENT DOCUMENTS

| | | | |
|---|---|---|---|
| 6,868,451 B1 | 3/2005 | Peacock | |
| 9,013,366 B2 | 4/2015 | Zheng et al. | |
| 2009/0213032 A1* | 8/2009 | Newport | G06F 3/1454 345/1.1 |
| 2009/0244015 A1* | 10/2009 | Sengupta | H04W 4/21 345/173 |
| 2010/0257251 A1 | 10/2010 | Mooring et al. | |
| 2011/0081923 A1 | 4/2011 | Forutanpour et al. | |
| 2011/0112819 A1* | 5/2011 | Shirai | G06F 9/45537 703/21 |
| 2011/0237274 A1 | 9/2011 | Wong et al. | |

(Continued)

FOREIGN PATENT DOCUMENTS

WO 2017184800 A1 10/2017

*Primary Examiner* — Amare Mengistu
*Assistant Examiner* — Sarvesh J Nadkarni
(74) *Attorney, Agent, or Firm* — Treyz Law Group, P.C.; G. Victor Treyz; Kendall P. Woodruff

(57) ABSTRACT

A system may include electronic devices that communicate wirelessly. When positioned so that a pair of devices overlap or are near to one another, the devices may operate in a linked mode. During linked operations, devices may communicate wirelessly while input gathering and content displaying operations are shared among the devices. One or both of a pair of devices may have sensors. An orientation sensor, motion sensor, optical sensor, and/or other sensors may be used in identifying conditions in which to enter the linked mode and to identify a region where displays in the pair of devices overlap.

24 Claims, 13 Drawing Sheets

(56) References Cited

U.S. PATENT DOCUMENTS

| | | |
|---|---|---|
| 2011/0239114 A1 | 9/2011 | Falkenburg et al. |
| 2012/0206319 A1 | 8/2012 | Lucero et al. |
| 2013/0091205 A1 | 4/2013 | Kotler et al. |
| 2014/0375834 A1* | 12/2014 | Lohan ................. G06F 9/52 348/211.99 |
| 2015/0324109 A1* | 11/2015 | Lee ................. G06F 3/1423 715/761 |
| 2016/0065374 A1* | 3/2016 | Sauerwald ............ G06F 21/44 726/19 |
| 2019/0138063 A1* | 5/2019 | Xiao ................. G06F 1/1686 |
| 2019/0278339 A1* | 9/2019 | Cooper ............... G06F 1/1616 |

* cited by examiner

SYSTEMS WITH OVERLAPPED DISPLAYS

This application claims the benefit of provisional patent application No. 62/906,654, filed Sep. 26, 2019, which is hereby incorporated by reference herein in its entirety.

FIELD

This relates generally to electronic devices, and, more particularly, to systems with multiple electronic devices.

BACKGROUND

Electronic devices such as computers and cellular telephones are often used as stand-alone devices. Although it is possible to wirelessly share data between these devices, sharing can be complex and cumbersome.

SUMMARY

A system may include electronic devices that communicate wirelessly. The devices may include displays. In some arrangements, devices may be positioned so that the displays of the devices overlap.

When positioned so that a pair of devices overlap or are adjacent to one another, the devices may operate in a linked mode. During linked operations, devices may communicate wirelessly while input gathering and content displaying operations are shared among the devices. For example, a user may seamlessly move a pointer that is present on the display of a first device to the display of a second device. Using the pointer or other user input, content may be moved between devices (e.g., a file on one display may be dragged and dropped onto another display, thereby sharing the file between devices).

One or more devices in the system may have sensors. Sensor data such as motion and orientation data may be used in determining when devices should be linked. To determine which portion of a display in a first device is overlapped by a display in a second device, the system may adjust visual output on the display of the first device while gathering corresponding camera input or other optical measurements with the second device. A binary search or other position determination algorithm may be used by the system to identify the relative positions of the devices.

DETAILED DESCRIPTION

Electronic devices with displays may be linked. This allows a user to move content between devices and perform other operations involving the use of the linked devices. In some configurations, electronic devices are placed adjacent to one another or are positioned so that one device overlaps the other.

Figure 1:
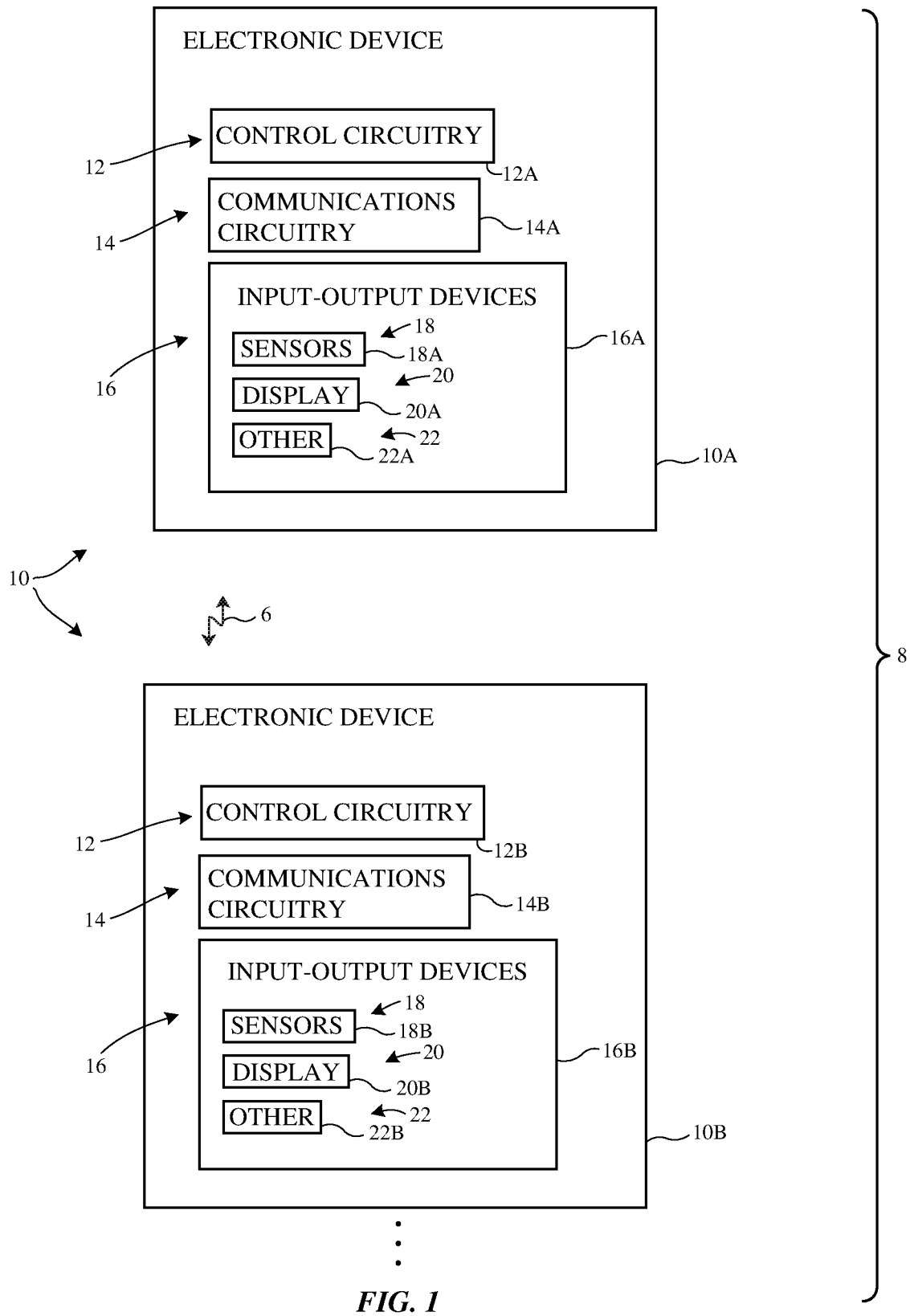
FIG. 1 is a schematic diagram of an illustrative system with electronic devices in accordance with an embodiment.

An illustrative system with electronic devices is shown in FIG. 1. As shown in FIG. 1, system 8 may include electronic devices 10. There may be any suitable number of electronic devices 10 in system 8 (e.g., at least two, at least three, at least four, fewer than ten, fewer than five, etc.).

Each device 10 may be a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices.

In the example of FIG. 1, devices 10 include a first device 10A and a second device 10B. Devices 10 may include control circuitry 12 (e.g., control circuitry 12A in device 10A and control circuitry 12B in device 10B). Control circuitry 12 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, control circuitry 12 may communicate using communications circuitry 14 (e.g., communications circuitry 14A in device 10A and communications circuitry 14B in device 10B). Communications circuitry 14 may include antennas, radio-frequency transceiver circuitry, and other wireless communications circuitry and/or wired communications circuitry.

Circuitry 14, which may sometimes be referred to as control circuitry and/or control and communications circuitry, may, for example, support bidirectional wireless communications between devices 10 over wireless link 6 (e.g., a wireless local area network link, a near-field communications link, or other suitable wired or wireless communications link (e.g., a Bluetooth® link, a WiFi® link, a simultaneous dual band WiFi link, a WiFi Direct link, a 60 GHz link or other millimeter wave link, etc.). Wired communications also be supported.

During operation of system 8, devices 10 may communicate wirelessly or via wired paths to control the operation of system 8. For example, user input and other input gathered using sensors and other circuitry in one or more devices 10, output such as visual content to be displayed on displays in devices 10, and other input and/or output information may be wirelessly transmitted or transmitted via wired connections to one or more devices 10 and thereby shared among devices 10. For example, input can be gathered from a user on device 10A and/or device 10B and used in controlling device 10A and/or device 10B, output can be generated on device 10A and/or device 10B (e.g., using control circuitry 12) and subsequently presented on a display, speaker, or other output component(s) in device 10A and/or 10B, and/or other sharing operations may be performed. This allows a user to drag and drop content between devices 10, to perform screen-sharing operations, and/or to perform other cooperative operations. When functionality is shared between devices 10A and 10B in this way, devices 10A and 10B may be referred to as operating in a linked mode. If desired, three or more electronic devices 10 may communicate with each other in system 8.

As shown in FIG. 1, devices 10 may include input-output devices 16 (e.g., input-output devices 16A on device 10A and input-output devices 16B on device 10B). Input-output devices 16 may be used in gathering user input, in gathering information on the environment surrounding the user, and/or in providing a user with output. Devices 16 may include sensors 18A and 18B. Sensors 18 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors.

Input-output devices 16 may also include displays 20 (e.g., one or more displays 20A and/or one or more displays 20B). Displays 20 may be organic light-emitting diode displays, displays based on arrays of crystalline semiconductor dies forming light-emitting diodes, liquid crystal displays, electrophoretic displays, and/or other displays. Displays 20 may be touch-insensitive displays (e.g., displays without touch sensor arrays that are insensitive to touch) or may, if desired, be overlapped by a two-dimensional capacitive touch sensor or other touch sensor (e.g., displays 20 may be touch screen displays). A touch display may have a two-dimensional capacitive touch sensor formed from a two-dimensional array of touch sensor electrodes (e.g., transparent conductive electrodes) overlapping an array of display pixels. A touch-insensitive display (sometimes referred to as a non-touch-sensor display) does not contain a two-dimensional array of touch sensor electrodes and does not gather user touch input.

If desired, input-output devices 16 may include other devices 22 (e.g., devices 22A and/or 22B). Devices 22 may include components such as status indicator lights (e.g., light-emitting diodes in devices 10 that serve as power indicators, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 22 may also include power transmitting and/or receiving circuits configured to transmit and/or receive wired and/or wireless power signals. Devices 22 may include buttons, rotating buttons, push buttons, joysticks, keys such as alphanumeric keys in a keyboard or keypad, and/or other devices for gathering user input.

If desired, devices 22 may include haptic output devices. Haptic output devices can produce motion that is sensed by the user (e.g., through the user's fingertips, hands, arms, legs, face, or other body parts). Haptic output devices may include actuators such as electromagnetic actuators, motors, piezoelectric actuators, shape memory alloy actuators, electroactive polymer actuators, vibrators, linear actuators, rotational actuators, actuators that bend bendable members, actuator devices that create and/or control repulsive and/or attractive forces between devices 10 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10).

Figure 2:
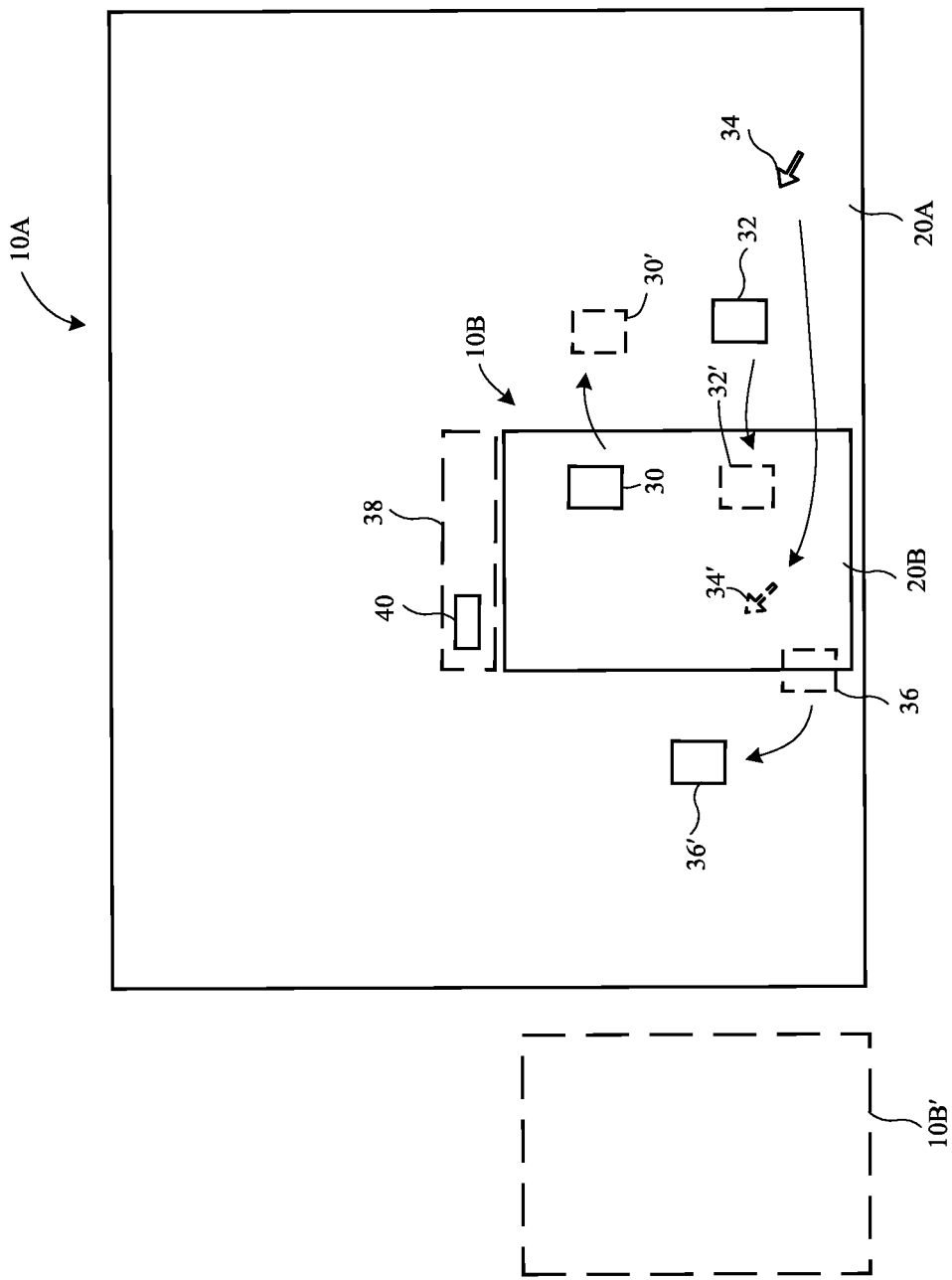
FIG. 2 is a front view of an illustrative pair electronic devices in accordance with an embodiment.

FIG. 2 is a front view of system 8 showing how display 20A of device 10A may be overlapped by display 20B of device 10B (e.g., when a cellular telephone or other small portable device is placed in front of a computer or other equipment with a larger display). In some arrangements, device 10B may be placed adjacent to device 10A as shown by illustrative device 10B'. The displays of devices 10A and 10B may share an adjacent edge or devices 10A and 10B may be separated from each other (e.g., by a distance of 1-100 cm, at least 10 cm, at least 100 cm, less than 10 m, less than 2 m, or other suitable distance). Configurations in which one display at least partially overlaps another display in system 8 are sometimes described herein as an example. Device 10A may, if desired, be a laptop computer in which display 20A is located in an upper housing (sometimes referred to as a display housing or upper housing portion) and in which input devices such as a keyboard with keys and trackpad (e.g., a two-dimensional touch sensor) are located in a lower housing (sometimes referred to as a base housing or lower housing portion). A hinge may be used to couple the upper and lower housing portions of device 10A for rotational motion (e.g., so that the keyboard of the laptop computer may rotate relative to the display of the laptop when the laptop is being opened or closed).

When device displays are overlapped as shown in FIG. 2, device 10A (e.g., the overlapped device) may display content in a region such as region 38 adjacent to one or more of the edges of device 10B. This content may include a label (e.g., "Bob's phone" or other label corresponding to the identity of device 10B) or instructions (e.g., "drag and drop files here to transfer"). Region 38 may serve as an indicator that devices 10A and 10B are linked and/or may operate as a transfer region to facilitate drag-and-drop sharing of content between devices 10. When device 10B is moved, region 38 may be moved accordingly. If desired, a shadow effect may be displayed around the periphery of device 10B as device 10B is being placed on device 10A. A halo or other indicator (e.g., a flashing halo) may be displayed on display 20A around at least some of the peripheral edge of display 20B to indicate when devices 10A and 10B are placed adjacent to each other and/or are linked. Haptic output (e.g., haptic output provided with a haptic output device in device 10B) may also be used to indicate when devices 10A and 10B are operating in linked mode and/or are preparing to operate in linked mode).

The placement of device 10B overlapping device 10A may also cause icons on display 20A to be automatically repositioned to avoid obscuring these icons (see, e.g., illustrative icon 36 on display 20A that is being moved to position 36' automatically in response to detection that device 10B is overlapping icon 36).

During linked operations, a user may move on-screen content between displays. For example, pointer 34 (and/or an icon or other content selected by pointer 34) may be moved seamlessly between devices 10 (e.g., to illustrative position 34' on display 20B and vice versa). This allows icon 32 and associated content on device 10A to be shared with device 10B (e.g., by dragging and dropping icon 32 to position 32') and allows content on device 10B to be shared with device 10A (e.g., by dragging and dropping icon 30 to position 30'). During these operations, the content on display 10B may seamlessly extend onto surrounding portions of display 10A so that display 10A and display 10B operate as a single visual output space for the user of system 8 (e.g., a computer desktop). Icons that are moved or otherwise manipulated (e.g., by clicking or other gestures) may correspond to photographs, word processing documents, media files, email messages, software applications, files associated with other content, and/or other items.

Dragging and dropping operations may be performed using cursor 34 and/or touch input. For example, a user may use a track pad or other input component in device 10A to move cursor 34 and thereby move an icon or other content between devices 10 and/or the user may perform a flick gesture (sometimes referred to as a swipe gesture) or drag-and-drop gesture using a touch sensor overlapping display 20B (and/or display 20A) to move content. In some configurations, a user may flick (swipe), drag and drop, or otherwise share content between devices 10 using region 38 (e.g., by placing an icon such as illustrative icon 40 of FIG. 2 into region 38 or a predetermined portion of display 20B). A user may also use pointer 34 on display 20A and/or display 20B to double click or otherwise select items (e.g., to click on an icon to launch and application, etc.). When an item is selected (e.g., when an email program is launched on device 10B), a user may operate the selected item (e.g., the email program) using the shared input circuitry of device 10A. For example, a user may type text into an email application on device 10B using a keyboard in device 10A. Both landscape and portrait orientations may be used for device 10B.

Cooperative operations such as these may be performed using control circuitry 12A and/or 12B. In performing these operations, control circuitry 12 may gather sensor information indicative of the position of device 10B (and display 20A) relative to device 10A (and display 20A). For example, sensor measurements using sensors 18 (e.g., relative position information) may be used to determine the display pixel coordinates that correspond to the portion of display 20A that is overlapped by display 20B so that screen content can be shared accordingly (e.g., so that content can be seamlessly displayed across displays 20A and 20B, so that items can be moved between displays 20A and 20B, etc.).

Figure 3:
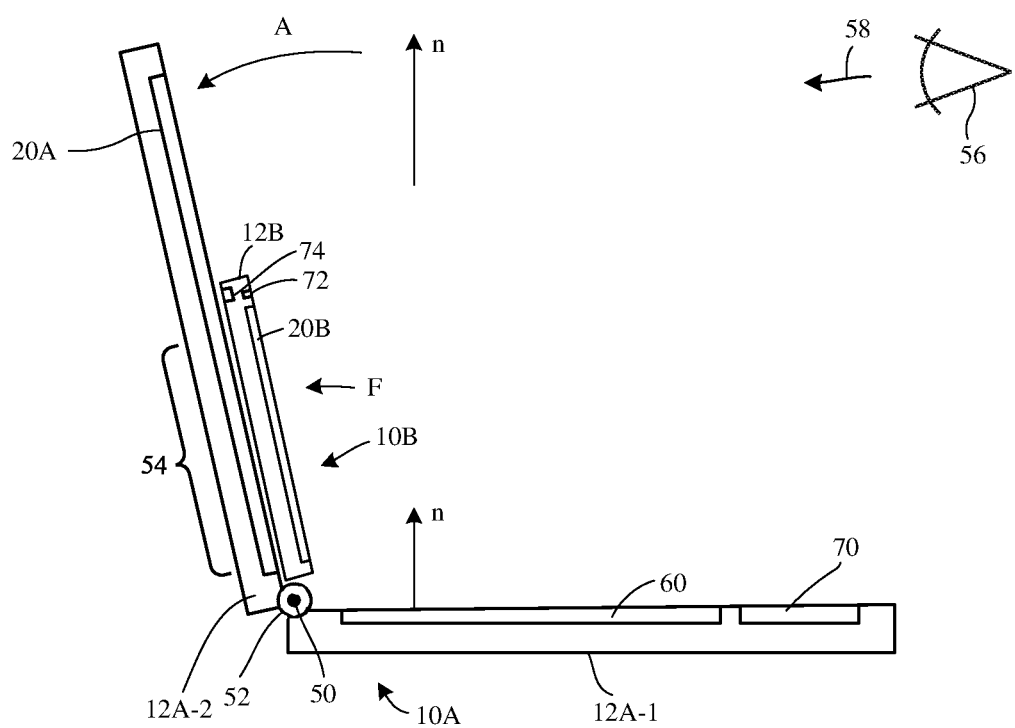
FIG. 3 is a side view of an illustrative system with electronic devices in accordance with an embodiment.

FIG. 3 is a cross-sectional side view of system 8 in an illustrative configuration in which device 10A is a laptop computer and device 10B is a portable device such as a cellular telephone with a display that is smaller than display 20A of device 10A. In general, devices 10A and 10B may be any suitable electronic devices (e.g., device 10A may be a tablet computer, television, desktop computer, cellular telephone, etc. and device 10B may be a cellular telephone, wristwatch, tablet computer, etc.).

As shown in FIG. 3, device 10A (a laptop computer) may have a first housing portion such as base housing portion 12A-1 that is coupled to a second housing portion such as display housing portion 12A-2 by hinge 50. This allows portion 12A-2 to rotate about hinge axis 52 with respect to portion 12A-1. Device 10A may have a keyboard such as keyboard 60 with alphanumeric keys and may have a two-dimensional capacitive touch sensor (see, e.g., trackpad 70).

During normal operation, housing portion 12A-2 may be angled with respect to housing portion 12A-1. For example, housing portion 12A-2 may be tilted at an angle A with respect to surface normal n of the surface of housing portion 12A-1. Angle A may be, for example, 0-45°, 10-40°, at least 5°, at least 15°, at least 20°, less than 50°, less than 40°, less than 30°, or other suitable angle. As shown in FIG. 3, device 10B may have may have a display such as display 20B on front face F of device 10B. Device 10B may have one or more cameras such as front-facing camera 72 on front face F and opposing rear-facing camera 74 on an opposing rear face of device 10B. In the orientation of FIG. 3, camera 74 faces display 20A in display housing portion 12A-2 of device 10A.

When device 10B is placed in front of device 10A, a viewer such as viewer 56 who is viewing display 20A in direction 58 will observe that display 20B of device 10B is overlapping a portion of display 20A such as the portion of display 20A in region 54. One or more sensors may be used to detect when device 10B is resting against display 20A of device 10A in this way. For example, device 10B may detect that device 10B is resting against the display in the display housing of a laptop computer by analyzing angle A using a gyroscope or other orientation sensor (e.g., angular orientation sensor) and by sensing when device 10B is at rest. If these conditions (and/or other suitable conditions) are met and if devices 10A and 10B are wirelessly paired (e.g., using local network pairing such as successful Bluetooth® pairing, near-field communications pairing, etc.), devices 10A and 10B may enter a linked mode of operation. The linked mode may be started automatically or may be started after a user manually confirms that linked mode should be entered. In general, linking of devices 10 may be performed based on user input (e.g., user input gathered by devices 16) and/or may be linked based on other criteria (e.g., devices 10 may be linked automatically and/or semiautomatically based on information from input-output devices 16 and/or communications circuitry 14 in addition to or instead of user input information). During linked mode, information on the position of device 10B on device 10A (e.g., information on the location of overlapped region 54 within display 20A) can be obtained using optical sensing or other sensing arrangements.

Figure 4:
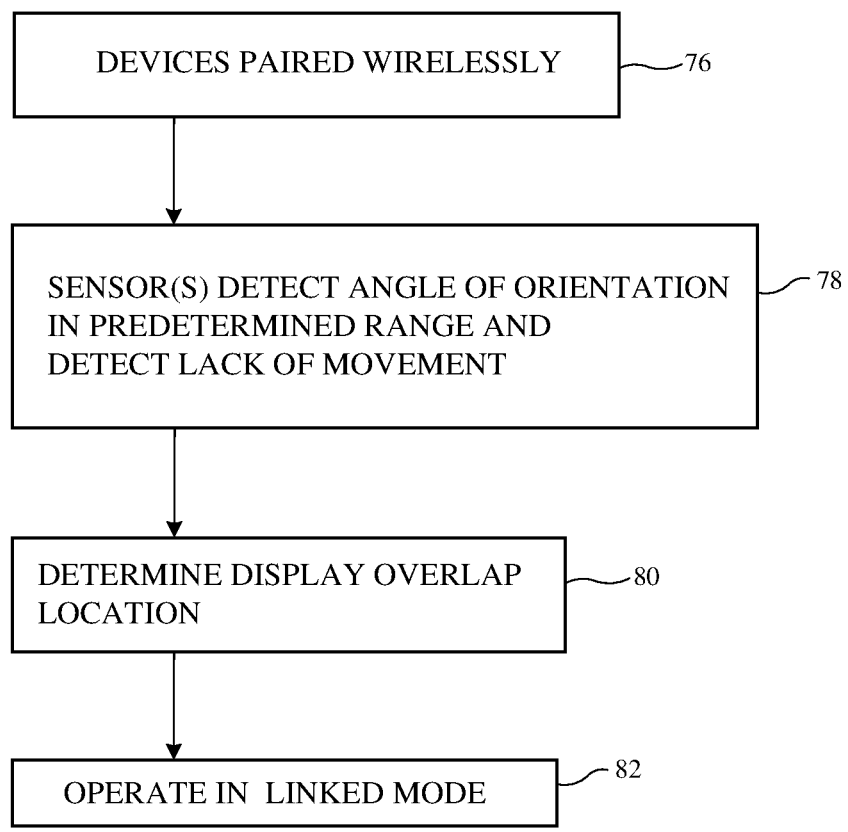
FIG. 4 is a flow chart of illustrative operations involved in operating electronic devices in a linked mode in accordance with an embodiment.

Illustrative operations involved in using system 8 are shown in FIG. 4.

In the example of FIG. 4, control circuitry 12 determines whether devices 10 are coupled wirelessly during the operations of block 76. For example, control circuitry 12 may use Bluetooth® or WiFi® circuitry or other communications circuitry 14 (e.g., wireless communications circuitry such as wireless local area network communications circuitry, near-field communications circuitry, etc.) to determine whether devices 10 are paired and/or are located on the same local area network or are otherwise in wireless communication over a wireless communications path (e.g., a localized path).

In response to determining that devices 10 are wirelessly communicating in this way, control circuitry 12 can conclude that devices 10 are in relatively close proximity to each other (e.g., within tens or hundreds of meters of each other). Operations may then proceed to block 78.

During the operations of block 78, control circuitry 12 may use one or more sensors in device 10B (and/or device 10A) to determine whether device 10B is likely resting against display 20A of device 10A (e.g., a laptop display in this example). The sensor circuitry may include an inertial measurement unit (e.g., a gyroscope, compass, and/or accelerometer) and/or other position and/or orientation sensor to measure angle A of FIG. 3 that the control circuitry of device 10B (and/or the control circuitry of device 10A) may use to determine whether angle A falls within a predetermined range of angles (e.g., 5-40°, 10-35°, etc.) that is indicative of scenarios in which device 10B is resting against an open laptop computer screen. The control circuitry of device 10B (and/or the control circuitry of device 10A) may also determine whether device 10B is at rest (e.g., whether accelerometer output for device 10B indicates that device 10B is moving less than a predetermined threshold amount). If the control circuitry determines that device 10B is at rest at an angle within the predetermined angular range, devices 10A and 10B can conclude that devices 10A and 10B are ready for operation in linked mode.

If desired, system 8 may monitor for user input indicating that devices 10A and 10B are to be operated in the linked mode. This user input may be obtained instead of or in addition to automatically detecting readiness for operation in linked mode using motion and orientation sensor circuitry in device 10B. The user input may be a particular gesture performed by moving device 10B towards display 20A, may be a shaking motion used to shake device 10B, may be a touch screen input, voice input, and/or other input detected using one or more sensors 18 or other devices 16. In response to detecting appropriate triggering input conditions (user input, a resting angle of device 10B within a predetermined angular range, and/or other conditions), operations may proceed to block 80.

During the operations of block 80, system 8 may use optical sensing and/or other sensing techniques to determine the relative position between devices 10A and 10B (e.g., to determine display overlap coordinates). With one illustrative configuration, device 10B may send a start command to device 10A. Device 10A may wirelessly receive the start command. In response to reception of the start command, device 10A may sweep a visual element (e.g., a vertically extending black bar) across display 20A (e.g., from left to right). The time of initiation of the sweep is known by system 8. Device 10B can monitor for the presence of the black bar using rear-facing camera 74. When the black bar sweeps by camera 74, device 10B (e.g., the control circuitry of device 10B) can measure the current time. From the measured time at which the black bar is detected, the known start time of the sweep operation, and a known predetermined sweep velocity for the sweeping black bar, system 8 can determine the horizontal position of device 10B and display 20B relative to display 20A and device 10A. The size of device 10B and screen 20B can be retrieved from a database by system 8 (e.g., using information on the type of device present), can be provided to device 10A from device 10B, can be measured by sweeping a horizontally extending black bar vertically to determine the height of camera 74, etc.

With another illustrative configuration, the relative position between devices 10A and 10B and therefore the location of the portion of display 20A that is overlapped by display 20B can be determined by using a binary search. With this type of arrangement, a first half of display 20A has a first visual attribute (e.g., the first half is black) and the other half of display 20A has a second visual attribute (e.g., the second half is white). Camera 74 determines whether camera 74 is on the first or second half of display 20A by measuring the output from display 20A. After determining which half of display 20A contains camera 74, subsequent iterations of the binary search may be performed, each time dividing the current area into halves and providing the halves with different respective first and second attributes. In this way, system 8 can successively narrow the possible location of camera 74 until a precise measurement of the location of camera 74 is determined (and therefore the area of display 20A that is overlapped by display 20B is determined). In general, any suitable search algorithm may be used (e.g., a binary search algorithm or other iterative approach). Moreover, any type of visual attribute may be modified (e.g., pixel color, pixel intensity, pixel on/off patterns, etc.). If desired, the modulation of the visual appearance of the pixels of display 20A may be subtle and therefore not detectable by an ordinary user (e.g., the adjustment of the visual appearance of display 20A during binary searching operations may be unnoticeable to the unaided eye of a user).

After determining which region of display 20A is overlapped by display 20B, system 8 can operate in linked mode (block 82). During the operations of block 82, tasks associated with input gathering and the displaying of content are shared by devices 10 in system 8 as described, for example, in connection with FIG. 2 (e.g., input and may be shared across devices 10, content may be seamlessly displayed on display 20B overlapping display 20A, etc.).

Figure 5:
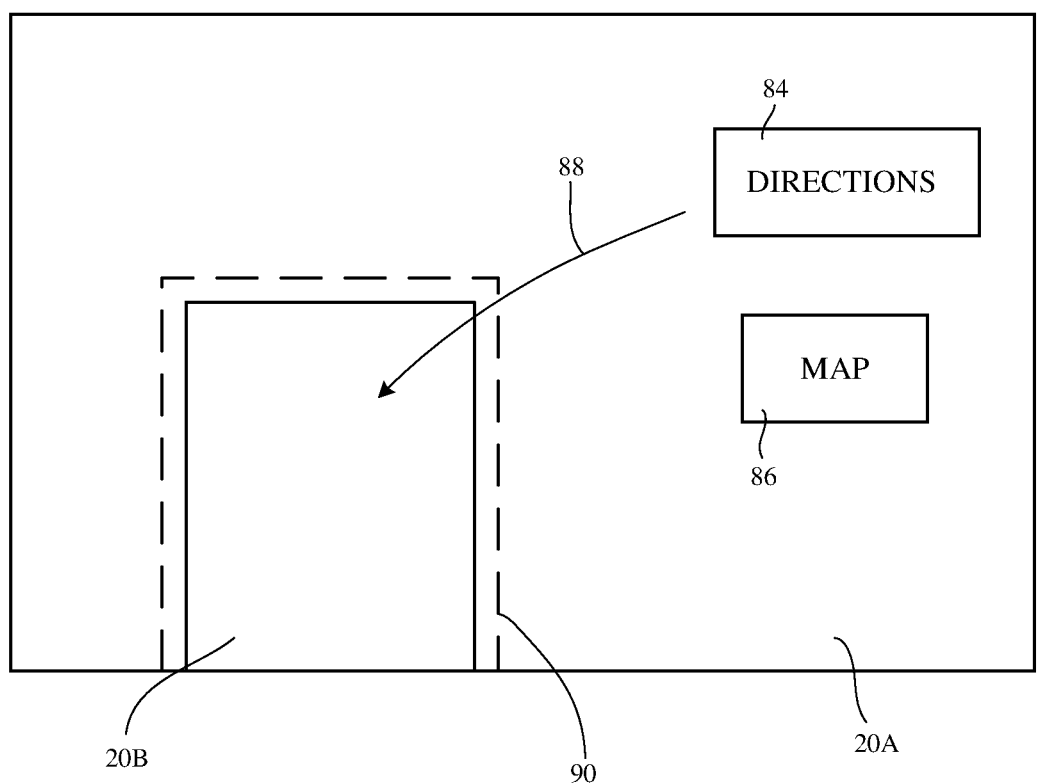
FIG. 5 is a diagram of an illustrative system with a pair of electronic devices in which an item is being shared by dragging and dropping in accordance with an embodiment.

As shown in FIG. 5, a halo such as halo 90 or other feedback (e.g., haptic output from device 10A and/or 10B, audio output from device 10A and/or 10B, and/or visual output from device 10A and/or 10B) may be provided to the user in response to placement of device 10B on device 10A, in response to entering linked mode, and/or in response to other events. In the example, of FIG. 5, a user is using device 10A and display 20A to interact with a mapping application. The application displays map 86 and associated directions (e.g., driving directions) 84. When a user links devices 10A and 10B, the user is able to drag and drop directions 84 onto display 20B of device 10B, as indicated by arrow 88. Feedback (e.g. halo 90, audio feedback, haptic feedback, etc.) may be provided to confirm that the drag and drop operation or other sharing operation has succeeded.

The dragging and dropping operation of FIG. 5 causes device 10A to wirelessly share directions 84 and/or other items associated with the current state of the mapping application on device 10A with device 10B. The user may initiate this action if, for example, the user has researched driving directions on device 10A and is interested in having these directions available on device 10B (e.g., because the user is embarking on a trip and is leaving device 10A behind).

Figure 6:
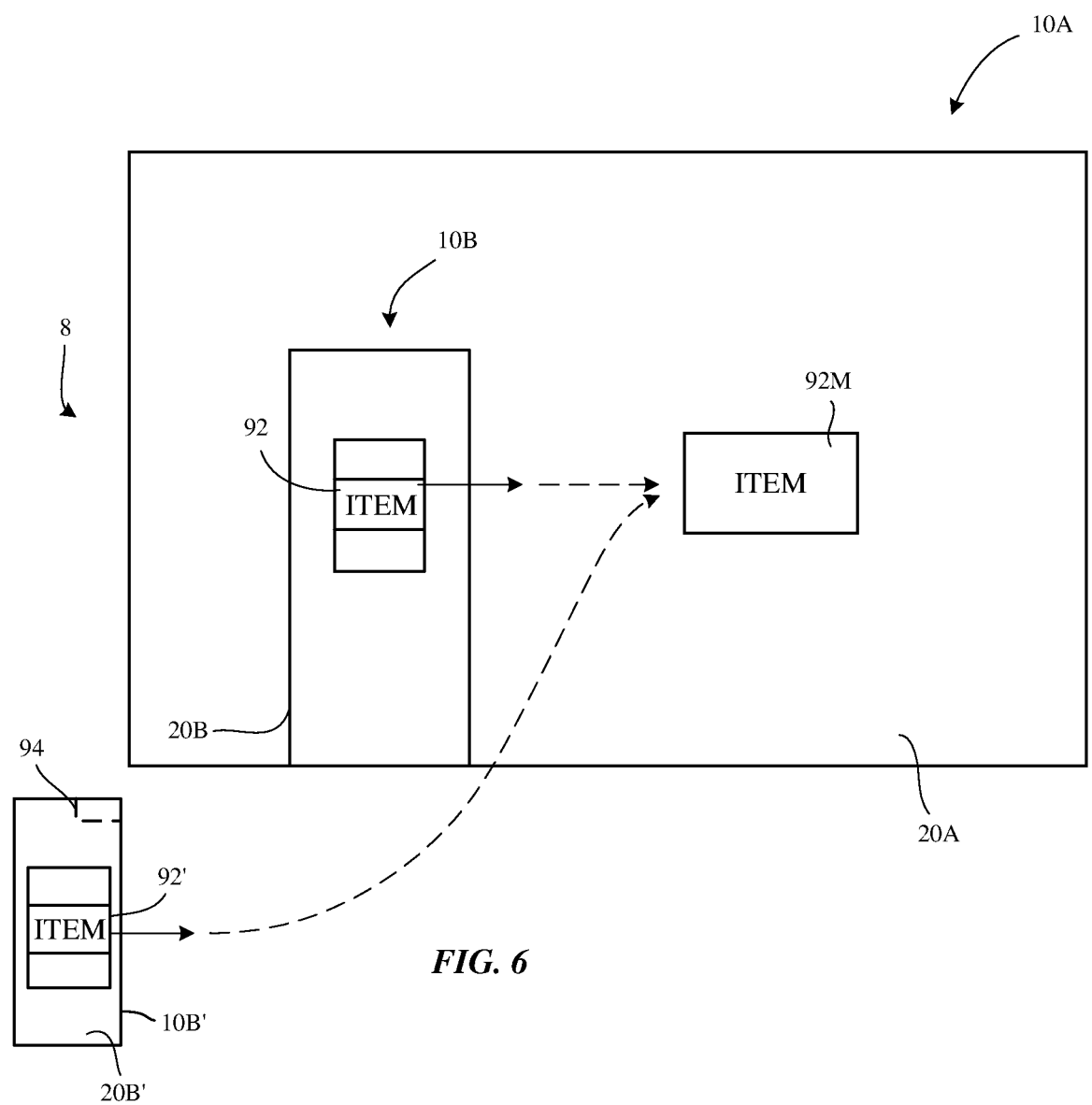
FIG. 6 is a diagram of an illustrative system with a pair of electronic devices in which an item is being shared by swiping in accordance with an embodiment.

In the illustrative configuration of FIG. 6, a user is sharing an item between devices 10B and 10A using touch gestures. In particular, a user is presented with a list of items such as item 92 on display 20B of device 10B. Item 92 may an email message or other item (e.g., a document, song, picture, or other content). Display 20B may be touch sensitive, so that the user may swipe item 92 to the side (e.g., to the right in FIG. 6) to share item 92 between device 10B and device 10A. System 8 may, as an example, move item 92 or a copy of item 92 to display 20A (as shown by shared item 92M on display 20A) and may copy associated email content, audio content, image content, etc. from device 10B to device 10A. If desired, force input, voice input, air gestures, and/or other input may be used to cause device 10B to share information with device 10A (or to cause device 10A to share information with device 10B). Sharing operations may be performed whenever devices 10A and 10B are linked.

If desired, linked mode operations can take place when devices 10A and 10B are in close proximity to each other without touching (e.g., within 20 m, within 2 m, at least 10 cm, or other suitable distance where devices 10A and 10B are not touching), as shown by the sharing (e.g., by swipe gesture or otherwise) of illustrative item 92' on display 20B' of device 10B' with device 10A. If desired, a user may place nearby devices in this type of linked mode of operation (e.g., a mode in which touch gestures such as swipes and/or other such inputs are used to initiate item sharing while devices 10A and 10B are in wireless communication but not touching each other) by use of a drop down menu (e.g., menu 94). The drop down menu may presented when, for example, a user drags a finger downward from the upper edge of device 10B'.

Figure 7:
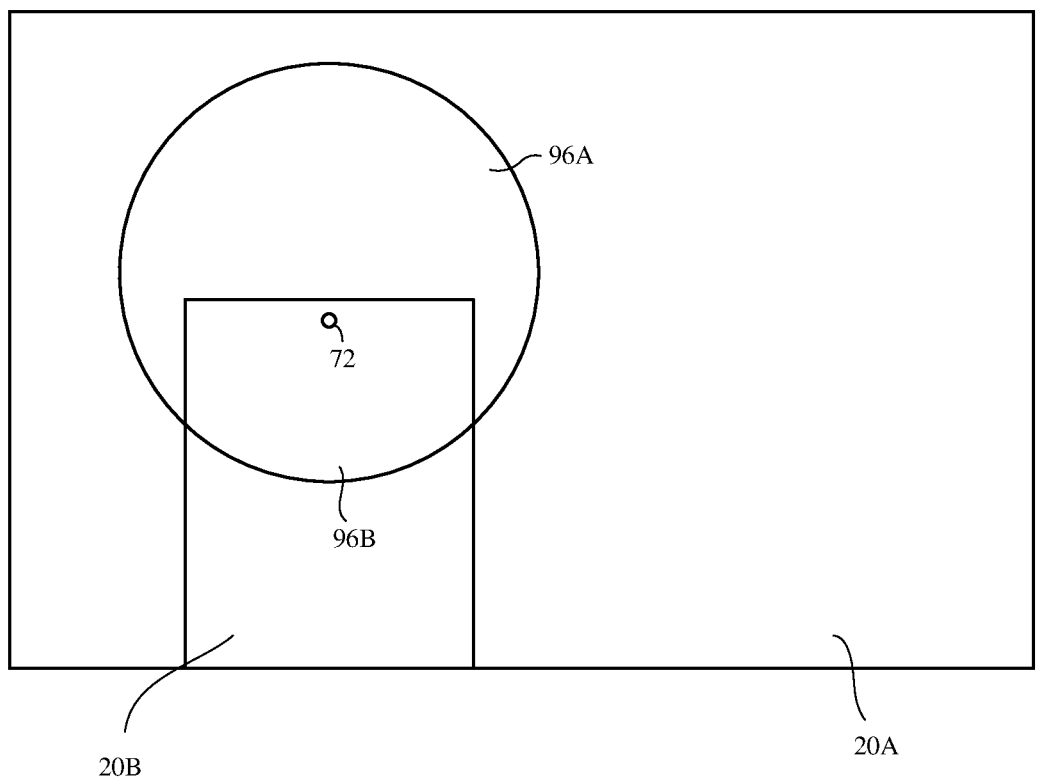
FIG. 7 is a diagram of an illustrative system with a pair of electronic devices in which an item is being displayed partly on a first of the devices and partly on a second of the devices in accordance with an embodiment.

FIG. 7 shows how camera 72 of device 10B may, if desired, be used to capture input such as video images (e.g., a moving image) for a video telephone call. During video telephone operations, an image of a user (e.g., the user's head captured with camera 72) may be displayed. A first portion of the image of the user may be displayed on display 20A, as shown by portion 96A and a second mating portion of the image of the user may be seamlessly displayed on overlapping display 20B, as shown by portion 96B. The video call may be initiated before or after devices 10A and 10B are in the linked mode. The use of camera 72 in device 10B to capture video makes it possible to omit cameras from device 10A, thereby helping to reduce the size of device 10A while enhancing screen area.

Figure 8:
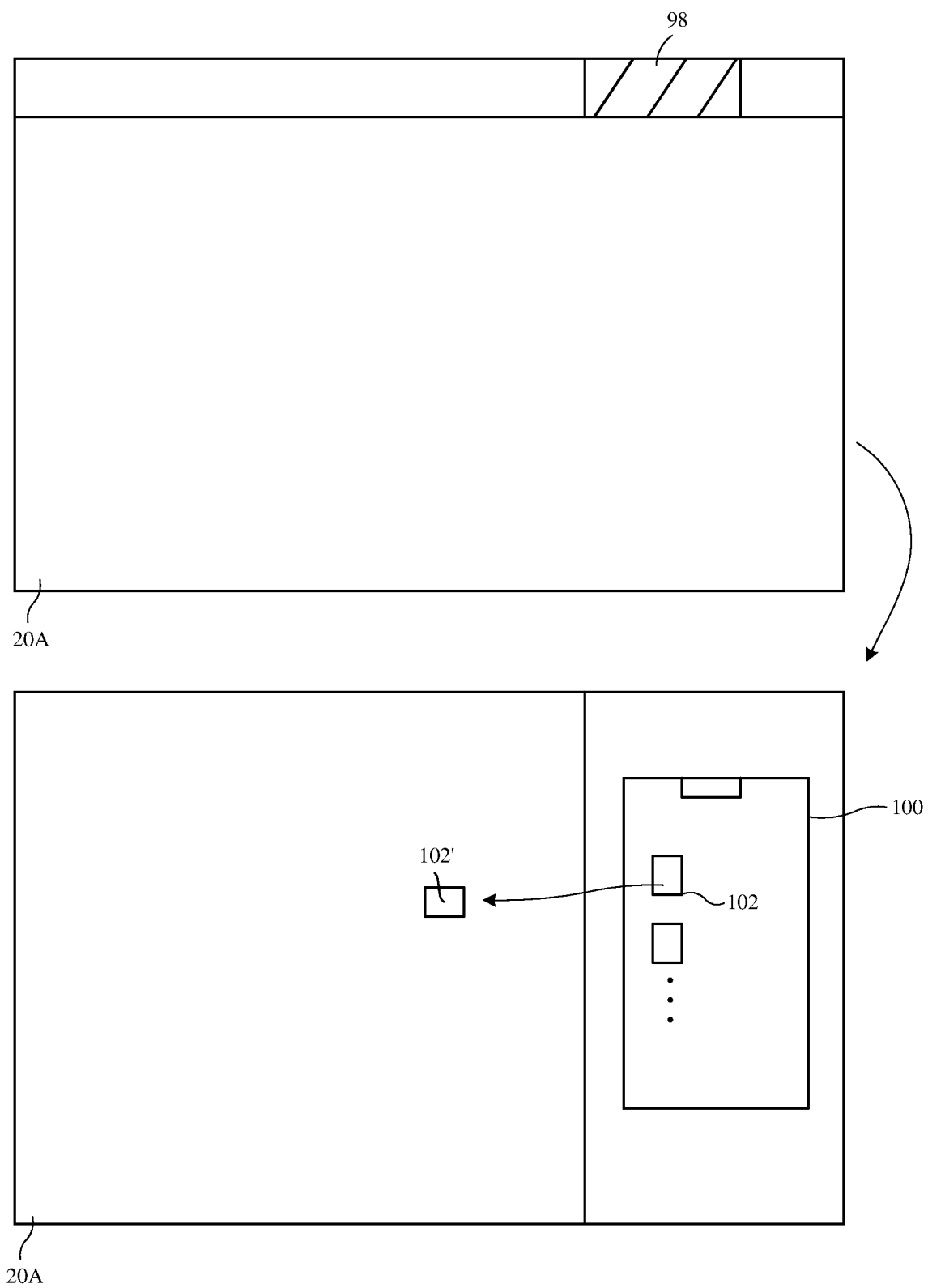
FIG. 8 is a diagram of an illustrative system with a pair of electronic devices in which an item is being shared using a virtual representation of a first of the devices that is being displayed on a second of the devices in accordance with an embodiment.

FIG. 8 is a diagram of an illustrative system in which device 10B is represented as a virtual device on display 20A of device 10A (e.g., an interactive image such as an interactive representation of device 10B using graphics). Initially, a user may select option 98 on display 20A of device 10A. This causes device 10A to display a visual representation of linked device 10A (sometimes referred to as a virtual phone, etc.), as shown by icon 100. Items such as email messages, photos, songs, videos, and/or other content present on device 10B may be displayed on the display of the virtual phone icon, as shown by illustrative item 102 on icon 100 on display 20A of device 10A. Device 10B may be linked to device 10A and may be nearby to device 10A without touching device 10A. A user may therefore share content from device 10B onto device 10A by using device 10A to drag and drop item 102 from the virtual phone represented by virtual device icon 100 on display 20A to another portion of display 20A (see, e.g., location 102' of FIG. 8). This operation causes device 10B to share item 102 with device 10A, even if device 10B and display 20B are not currently overlapping device 10A and display 20A.

Figure 9:
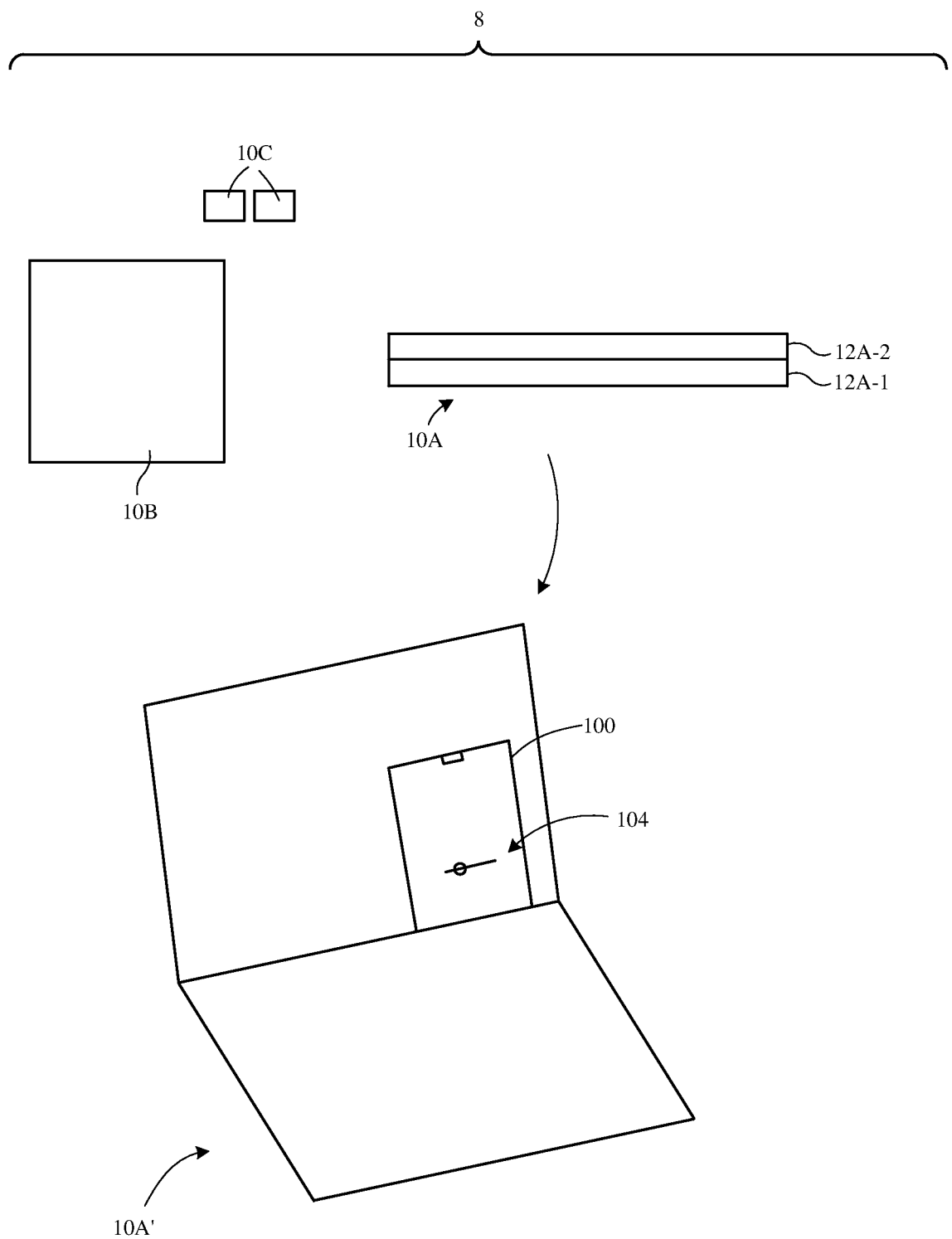
FIG. 9 is a diagram of an illustrative system with three interacting electronic devices in accordance with an embodiment.

In the example of FIG. 9, system 8 includes three linked electronic devices. Device 10B may be a cellular telephone (as an example), device 10A may be a laptop computer (as an example), and device 10C may be a pair of wireless ear buds (as an example). Device 10C may be paired with device 10B, allowing a user to listen to audio from device 10B on device 10C. As shown in the upper portion of FIG. 9, device 10A may initially be closed so that housing portions 12A-1 and 12A-2 rest flat against each other. When a user opens device 10A as shown by open device 10A' in the lower portion of FIG. 9, device 10A may display virtual phone icon 100 on the display of device 10A. The user may then use on-screen options on icon 100 such as adjustable on-screen option 104 to adjust the playback of audio from device 10B to device 10C. For example, controls that are displayed as interactive elements on the display of device 10A can be used to adjust playback volume and other playback attributes for device 10B as device 10B supplies audio to device 10C. The presentation of other types of content (e.g., video, etc.) may be controlled in this way if desired (e.g., when device 10C contains a display).

Figure 10:
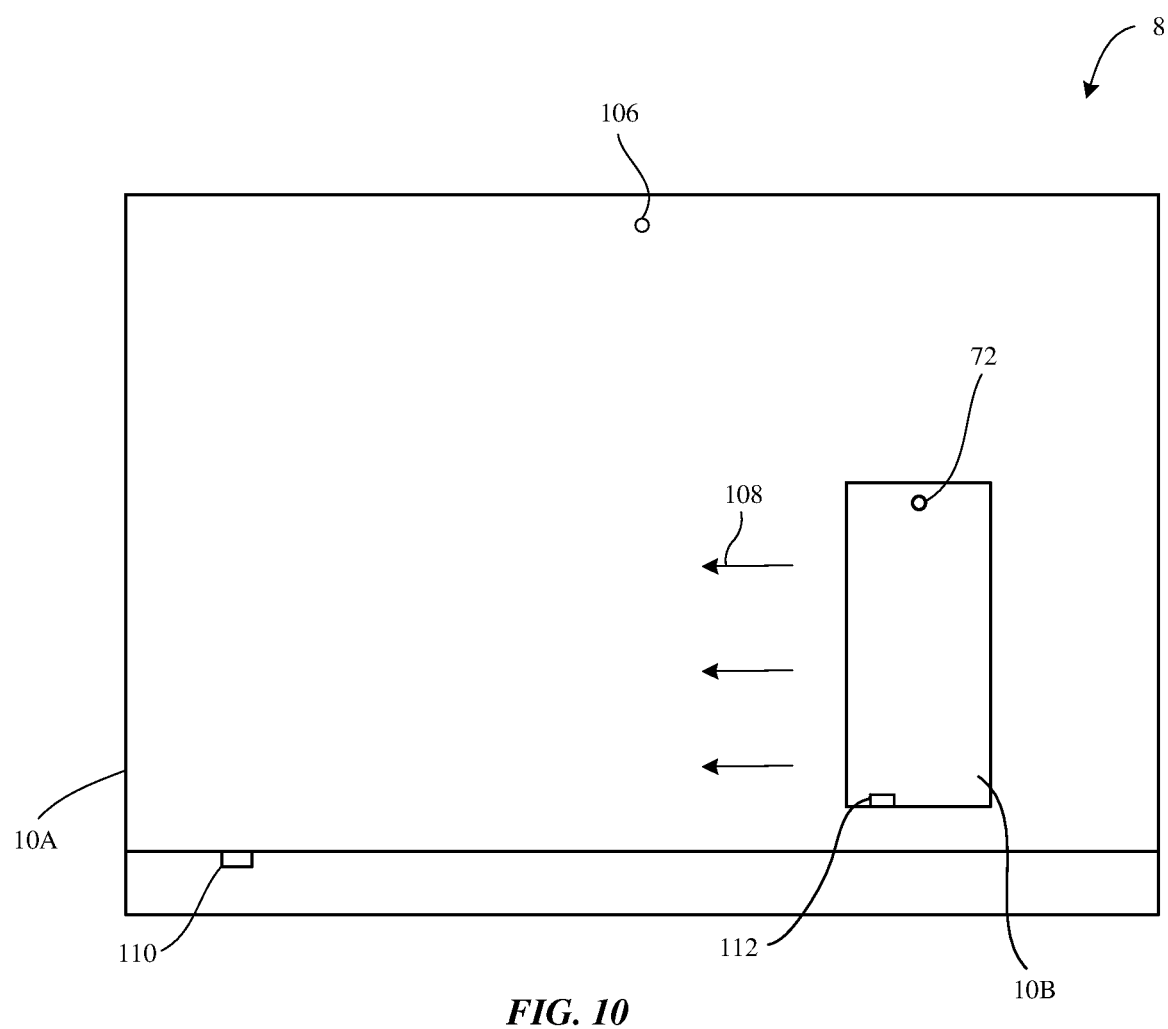
FIG. 10 is a diagram of an illustrative shared hardware arrangement for a system with a pair of electronic devices in accordance with an embodiment.

FIG. 10 shows how when device 10B overlaps device 10A, sensors in device 10B (e.g., optical sensors, ultrasonic sensors, or other sensors that emit and detect signals such as light, ultrasonic sound, and/or other signals 108) can detect the presence of a user's finger and/or other external objects on the display of device 10A (e.g., the finger sensing sensors of device 10B may be used to provide touch sensitivity to the display of device 10A, even when the display of device 10A is insensitive to touch). When devices 10A and 10B contain duplicative (or complementary) hardware, the overall operation of system 8 may be enhanced by sharing this hardware. For example, if both device 10A and device 10B contain input devices such as cameras (see, e.g., front-facing camera 72 on device 10B and camera 106 on device 10A), system 8 may use these multiple cameras together to capture three-dimensional images. Similarly, an audio component or other component in device 10B such as component 112 (e.g., a microphone or speaker) can be shared with an identical audio component or other component in device 10A such as component 110 (e.g., a microphone or speaker). Shared microphones may be used to capture directional sound information. Shared speakers may provide stereo sound, surround sound effects, etc. In general, any input-output devices of the same type and/or different types may be shared between linked devices 10 in system 8.

Figure 11:
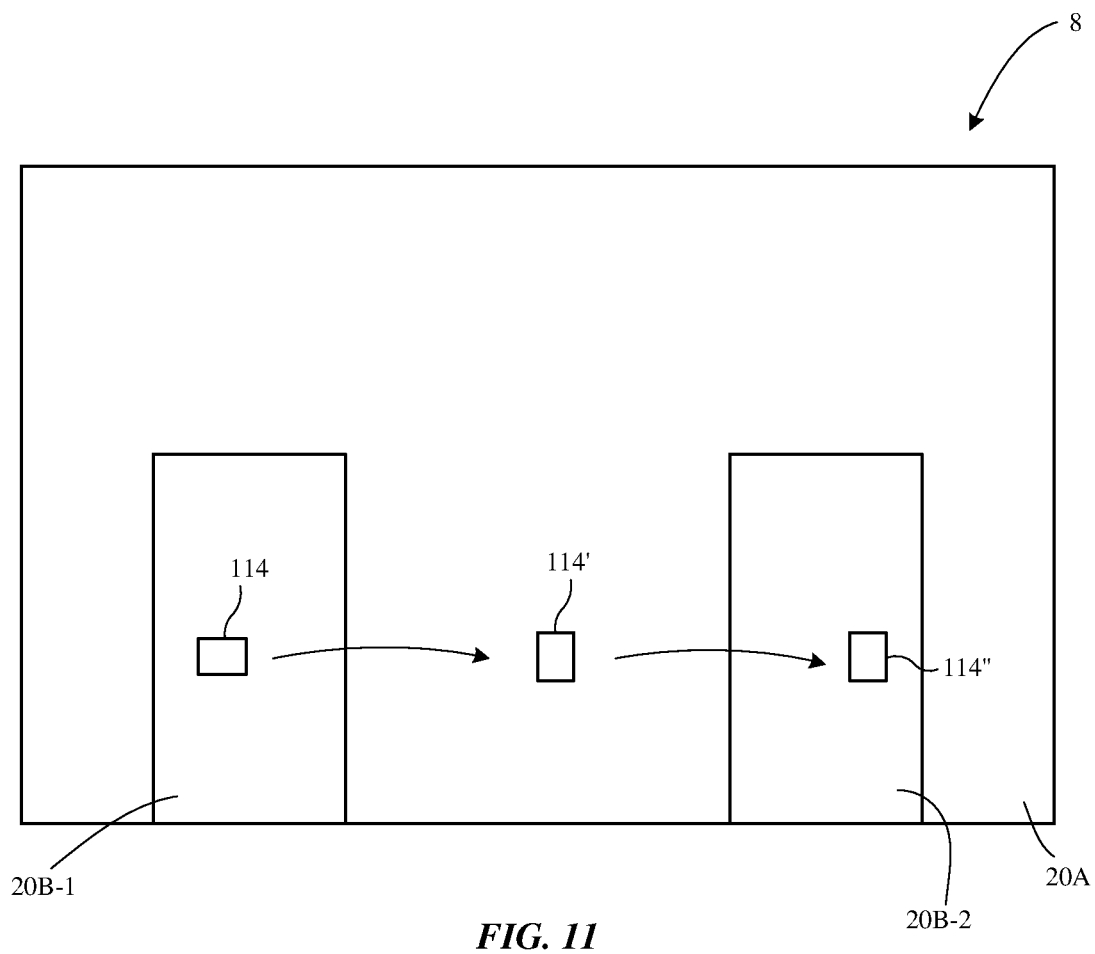
FIG. 11 is a diagram of an illustrative system in which an item is being shared by transferring the item between a pair of devices using another device in accordance with an embodiment.

FIG. 11 is a diagram of system 8 in an illustrative configuration in which system 8 has three devices. Content can be shared between a first and third of these devices using a second of the devices as an intermediary. Initially, for example, content item 114 on display 20B-1 of the first device (e.g., a first cellular telephone belonging to a first user) can be shared (e.g., by dragging and dropping) with the second device (e.g., a laptop computer belonging to a second user), as shown by dragging and dropping item 114 of FIG. 11 to the location of item 114' on display 20A of the second device. The second user may then share item 114' from the second device to a third device (e.g., a cellular telephone belonging to the second user or other user). This may be done by using the second device to drag and drop item 114' to display 20B-2 of the third device, as shown by shared icon 114" on display 20B-2. In this way, the second device may be used both to move items from the first device onto the second device and to move items from the second device to the third device.

Figure 12:
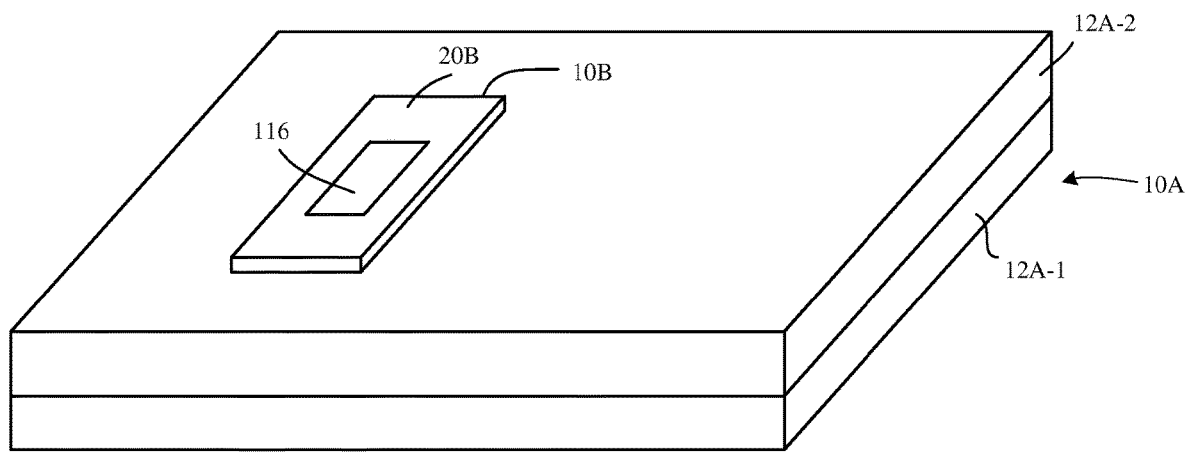
FIG. 12 is a perspective view of an illustrative system with a pair of devices in which one of the devices is revealing information about another of the devices in accordance with an embodiment.

In the illustrative configuration of FIG. 12, device 10B is overlapping device 10A while the housing of device 10A is closed (e.g., so that upper housing portion 12A-2 is resting flat against lower housing portion 12A-1). In this scenario, the display of device 10A is not visible. Nevertheless, after linking devices 10A and 10B, display 20B of device 10B may be used to allow a user to share items between devices (e.g. by swipe sharing or otherwise sharing items from device 20B to device 10A). As shown in FIG. 12, display 20B may be used to display an item such as item 116. Item 116 may be an item on device 10B that can be shared with device 10A while device 10A is closed (e.g., by swiping or using other user input), may be a control that allows a user to adjust the operation of device 10A while device 10A is closed (e.g., by adjusting audio playback, etc.), or may represent content on device 10A that a user can access through interactions with icon 116. As an example, a user may have a document on device 10A. When device 10B is placed on the outer surface of the housing of device 10A as shown in FIG. 12, item 116 (e.g., an icon corresponding to the document) may be displayed on display 20B. The document file continues to reside exclusively on device 10A in this example, but can be previewed by the user on display 20B of device 10B by selecting icon 116. In this way, display 20B of device 10B may serve as a "window" into the content on device 10A in situations in which the display of device 10A is not visible to the user.

Figure 13:
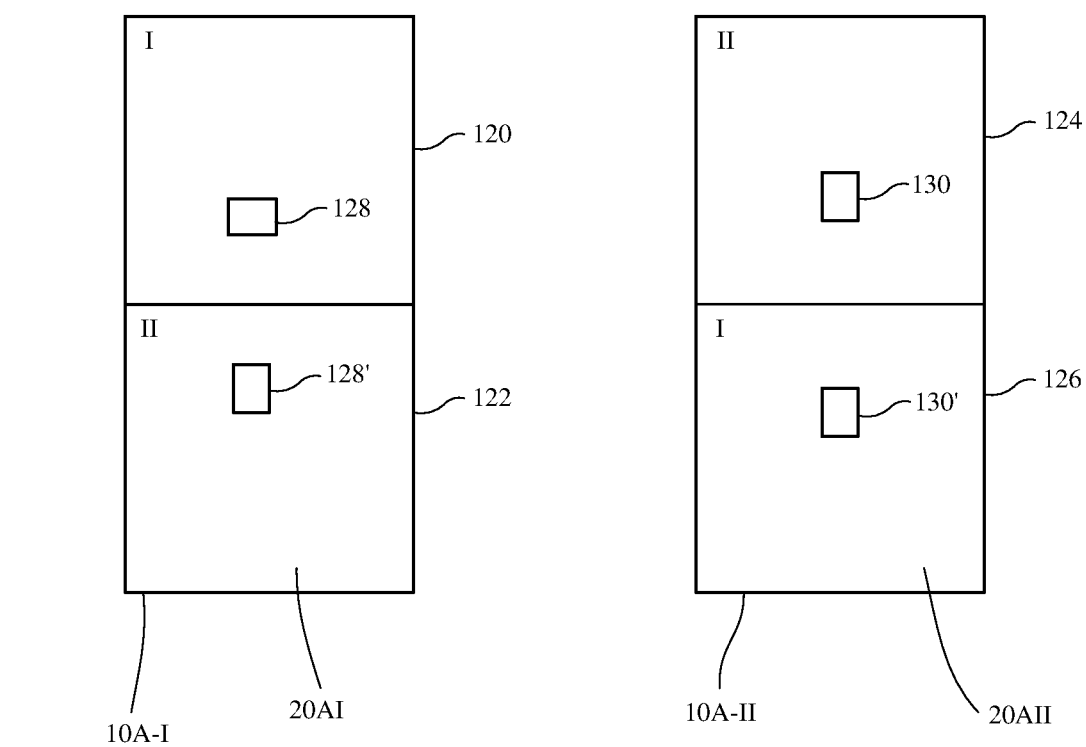
FIG. 13 is a diagram of a system with a pair of devices each of which has on-screen areas for facilitating content sharing between the devices in accordance with an embodiment.

FIG. 13 is a diagram of system 8 in an illustrative configuration in which a first device 10A-I is linked with a second device 10A-II. Devices 10A-1 and 10A-II may be, for example, immediately adjacent to each other with a shared physical edge or may be in close proximity to each other (e.g., within 20 m, less than 5 m, less than 2 m, or other suitable distance). When linked in this way, display 20AI of device 10A-I may present region 120 representing content on device 10A-I such as item 128 and may present region 122 representing content on device 10A-II. A user may share item 128 from device 10A-I to device 10A-II by dragging and dropping item 128 from region 120 to region 122, as illustrated by shared item 128'. Items may be shared from device 10A-II to device 10A-I similarly. As shown on the right side of FIG. 13, display 20AII of device 10A-II may present region 124 representing content on device 10A-II such as item 130 and may present region 126 representing content on device 10A-I. A user may share item 130 from device 10A-II to device 10A-I by dragging and dropping item 130 from region 124 to region 126, as illustrated by shared item 130'.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A laptop computer configured to wirelessly communicate with a portable device with a camera and a portable device display, comprising:
   a housing having an upper portion and a lower portion coupled by a hinge;
   a laptop display that is touch-insensitive and that is supported by the upper portion of the housing;
   a keyboard and trackpad supported by the lower portion; and
   control circuitry configured to:
      display visual content on the laptop display while the camera captures images of the visual content;
      determine a location where the portable device display overlaps the laptop display based on the images of the visual content,
      wirelessly communicate with the portable device in a linked mode of operation, and
      in response to user input, share an item between the laptop computer and the portable device.

2. The laptop computer defined in claim 1 wherein the user input comprises drag-and-drop input and wherein the control circuitry is configured to share the item from the laptop computer to the portable device in response to the drag-and-drop input.

3. The laptop computer defined in claim 2 wherein the control circuitry is configured to display the item on the laptop display and wherein the drag-and-drop input comprises a drag-and-drop operation that drags and drops the item from the laptop display onto the portable device display.

4. The laptop computer defined in claim 1 wherein the user input comprises a swipe gesture on the portable device display, and wherein the control circuitry is configured to receive the item from the portable device in response to the swipe gesture.

5. The laptop computer defined in claim 1 wherein the control circuitry is configured to adjust the visual content on the display while the portable device uses the camera to capture the images.

6. The laptop computer defined in claim 5 wherein the control circuitry is configured to adjust the visual content to sweep a darkened bar across the laptop display.

7. The laptop computer defined in claim 5 wherein the control circuitry is configured to adjust the visual content to perform a binary search.

8. The laptop computer defined in claim 5 wherein the control circuitry is configured to adjust the visual content without allowing the adjustment of the visual content to be discernable during unaided viewing of the laptop display.

9. The laptop computer defined in claim 1 wherein the control circuitry is configured to provide feedback in response to entering the linked mode.

10. The laptop computer defined in claim 9 wherein the feedback comprises visual output on the laptop display.

11. The laptop computer defined in claim 10 wherein the visual output comprises a halo running along at least part of a peripheral edge of the portable device.

12. The laptop computer defined in claim 9 wherein the feedback comprises haptic output.

13. The laptop computer defined in claim 9 wherein the feedback comprises audio output.

14. The laptop computer defined in claim 1 wherein the control circuitry is configured to enter the linked mode at least partly in response to an angular orientation of the portable device.

15. The laptop computer defined in claim 1 wherein the control circuitry is configured to enter the linked mode at least partly in response to an amount of motion of the portable device.

16. The laptop computer defined in claim 1 wherein the shared item comprises map directions that are provided by the control circuitry to the portable device.

17. The laptop computer defined in claim 1 wherein the shared item comprises an email message that is received by the control circuitry from the portable device.

18. The laptop computer defined in claim 1 wherein the shared item comprises visual information that is received by the control circuitry from the portable device camera and that is displayed at least partly on the laptop display.

19. The laptop computer defined in claim 1 wherein the control circuitry is configured to display an interactive image representing the portable device on the laptop display.

20. The laptop computer defined in claim 19 wherein the user input comprises drag and drop input moving a visual element from the interactive image to a portion of the laptop display that does not contain the interactive image.

21. An electronic device that operates in a linked mode with an external device having an external device display, comprising:
    a touch sensitive display;
    an inertial measurement unit configured to detect an angle of orientation of the electronic device and to detect when the electronic device is at rest; and
    control circuitry configured to:
        enter a linked mode of operation with the external device when the angle of orientation is within a predetermined range of angles and when the electronic device is at rest; and
        wirelessly share an item from the electronic device to the external device based on a swipe gesture on the touch sensitive display.

22. The electronic device defined in claim 21 wherein the external device comprises a laptop computer, the electronic device comprising:
    a cellular telephone housing in which the touch sensitive display is mounted, wherein the inertial measurement unit comprises an angular orientation sensor that detects the angle of orientation of the electronic device by gathering information on an angle of orientation of the angular orientation sensor relative to the laptop computer, and wherein the control circuitry is configured to enter the linked mode of operation with the laptop computer based at least partly on the gathered information on the angle of orientation.

23. The electronic device defined in claim 22 wherein the item comprises an email and wherein the swipe gesture comprises a swipe right gesture on the email while the email is presented on the touch sensitive display.

24. A system comprising:
    a laptop computer having a first display that is touch-insensitive; and
    a portable electronic device with a second display and a camera configured to face the first display when the portable electronic device rests against the first display, wherein at least one of the laptop computer and the portable electronic device comprises control circuitry that determines a position of the portable electronic device relative to the laptop computer based on images from the camera, wherein the laptop computer and portable electronic device are configured to operate in a linked mode at least partly in response to orientation sensor information from the portable electronic device, and wherein input gathering and content displaying operations are shared between the laptop computer and the portable electronic device during operation in the linked mode.

* * * * *